July 23, 1940.   C. M. HINES   2,208,738
BRAKE AND SANDING CONTROL MEANS
Filed Oct. 18, 1939   4 Sheets-Sheet 1

Fig.1

INVENTOR
CLAUDE M. HINES
BY
ATTORNEY

July 23, 1940.  C. M. HINES  2,208,738
BRAKE AND SANDING CONTROL MEANS
Filed Oct. 18, 1939  4 Sheets-Sheet 4

INVENTOR
CLAUDE M. HINES
BY
ATTORNEY

Patented July 23, 1940

2,208,738

UNITED STATES PATENT OFFICE 2,208,738

BRAKE AND SANDING CONTROL MEANS

Claude M. Hines, Pittsburgh, Pa., assignor to The Westinghouse Air Brake Company, Wilmerding, Pa., a corporation of Pennsylvania Application October 18, 1939, Serial No. 299,996

20 Claims. (Cl. 291—2)

This invention relates to brake and sanding control means for vehicles, such as railway cars or trains, and has particular relation to apparatus automatically responsive to the rate of retardation of individual vehicle wheels or pairs of wheels for so controlling the braking and sanding operation as to prevent sliding of the vehicle wheels.

It is well known that if the brakes associated with the wheel of a vehicle are applied with sufficient force to exceed the adhesion or rolling friction between the wheel and the road surface or rail, the wheel begins to decelerate at a rapid rate, that is, slips and in a short interval of time, of the order of one or one and one-half seconds, decelerates to a locked-wheel condition and slides. Various types of devices have been proposed which are responsive to the rate of rotative deceleration of a vehicle wheel, while slipping, to cause sanding of the road surface or a rapid release of the brakes so that the slipping wheel ceases to decelerate and begins to accelerate back toward a speed corresponding to vehicle speed without actually attaining the locked-wheel condition. It will be understood that such devices for preventing sliding of vehicle wheels are highly desirable, particularly in the case of railway cars and trains, for the reason that the repair or replacement cost of railway car wheels necessitated by the development of flat spots on the wheels due to sliding is avoided.

It is an object of my invention, therefore, to provide novel apparatus of the above character, including electrical means responsive to the rate of rotative deceleration of individual wheels or connected pairs of wheels of a vehicle or car, for effecting automatically in succession a sanding operation and a rapid release of the brakes on the wheels so as to prevent sliding of the wheels.

It is another object of my invention to provide brake and sanding control apparatus, of the type indicated in the foregoing object, further characterized by mechanism which is effective to always cause sanding of the road surface or rail in advance of the vehicle wheels notwithstanding travel of a car or train in opposite directions at different times.

It is another object of my invention to provide brake and sanding control apparatus, of the type indicated in the foregoing objects, adapted to effect sanding of the road surface or rail in advance of all wheels of the vehicle or train when any one wheel or pair of wheels rotatively decelerates at a rate exceeding a certain rate but selectively effective to cause a rapid release of the brakes associated with only a limited number of wheels, such as those on a car truck, when one of the wheels of that number slips.

A further object is to provide an improved form of apparatus for detecting a wheel slipping condition and for then functioning to relieve the slipping condition before a locked wheel stage is reached.

The above objects, and other objects of my invention which will be made apparent hereinafter, are attained in several embodiments of my invention subsequently to be described and shown in the accompanying drawings, wherein—

Figure 1:
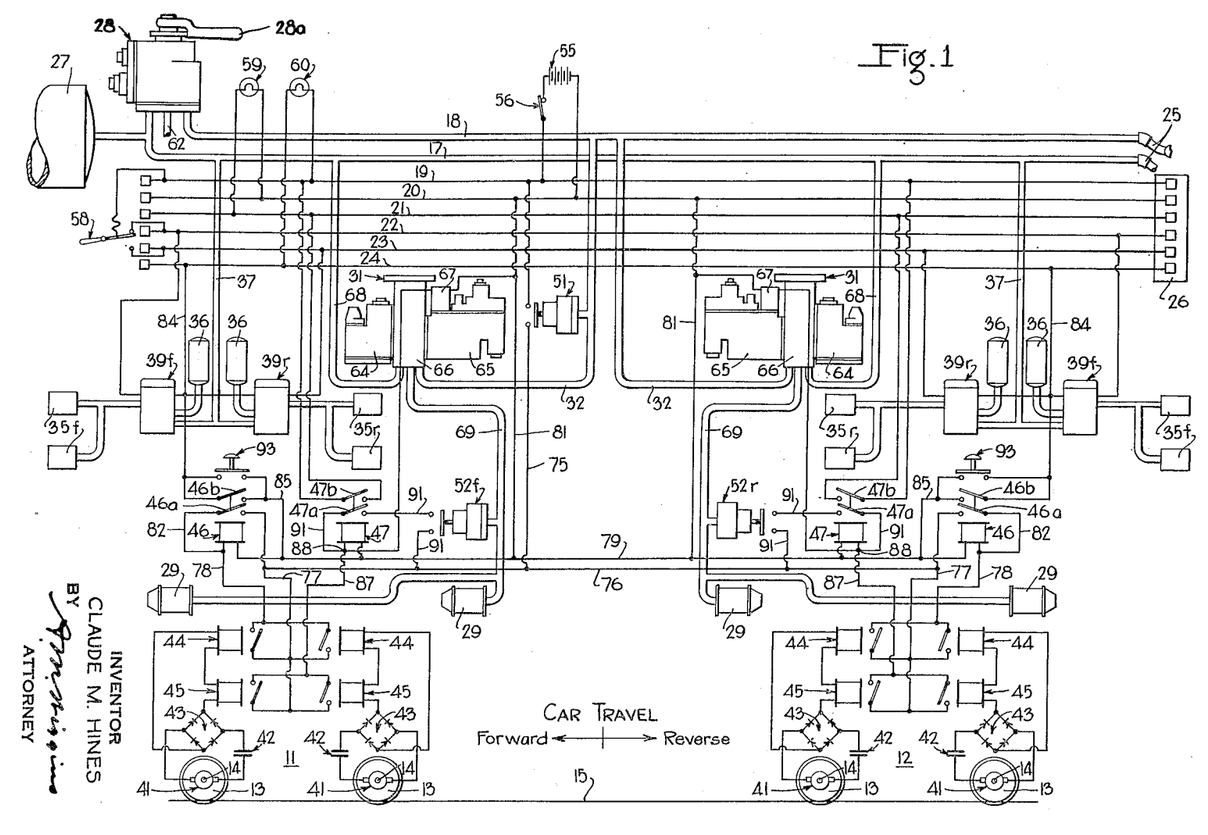
Fig. 1 is a diagrammatic view showing a brake and sanding control apparatus, embodying my invention, applied to a single railway car having two four-wheel trucks together with manual means for effecting directional control of sanding.

*Description of embodiment shown in Figure 1*

Referring to Fig. 1, the apparatus shown represents that for a single railway car having two four-wheel trucks 11 and 12, respectively referred to hereinafter as the front and rear wheel-trucks. It will be apparent that only one wheel 13 of the leading and trailing axles of each truck are shown in the drawings and that, actually two wheels 13 are fixed in conventional manner at opposite ends of each axle 14 so that the two wheels and axle rotate as a unit. The rail on which the wheels 13 roll is indicated by the line 15.

The apparatus shown comprises a pair of pipes or conduits 17 and 18, hereinafter designated the supply pipe and the control pipe respectively, that extend from end to end of the car and a plurality of train wires 19, 20, 21, 22, 23 and 24 that likewise extend from end to end of the car. In the case of a train of cars, the pipes 17 and 18 are made up of sections on successive cars that are connected in conventional manner through hose couplings 25. In a similar manner the sections of the train wires 19 to 24 on successive cars in a train are connected in any suitable manner, as by coupler 26, which may be either of the manual or automatic type.

The supply pipe 17 is constantly connected to and charged with fluid under pressure from a reservoir 27, hereinafter designated the main reservoir, which is in turn charged by a fluid compressor not shown. Control pipe 18 is normally at atmospheric pressure and is adapted to be charged to a desired pressure by fluid supplied from the main reservoir 27 under the control of a manually operated brake valve 28 of the self-lapping type.

Suitable friction brake devices, not shown, are provided in association with the car wheels 13, the brake devices being operated by means of suitable brake cylinders 29. As shown, a brake cylinder 29 is provided for each axle of each wheel truck although it will be understood that any suitable number of brake cylinders may be provided for each truck.

Fluid under pressure is supplied to the brake cylinders 29 of each car to effect application of the brakes and released from the brake cylinders to effect release of the brakes under the control of a pair of brake control valve mechanisms 31, one of which controls the brake cylinders of the front wheel-truck 11 and the other of which controls the brake cylinders for the rear wheel-truck 12.

As will be explained in further detail hereinafter, each valve mechanism 31 is connected by a branch pipe 32 to the control pipe 18 so that the valve mechanisms are operatively controlled according to variations of pressure in the control pipe 18 to correspondingly vary the pressure in the brake cylinders 29.

There is provided for each wheel truck a plurality, illustrated as two, of sanding devices 35f effective to deposit sand in advance of all the wheels of the truck when the car is traveling in a forward direction, assumed to be the left-hand direction, as indicated by the arrow in the lower central position of the drawings. In a similar manner, each wheel-truck is provided with two or more sanding devices 35r effective to deposit sand in advance of all the wheels of the truck when the car is traveling in a reverse or right-hand direction, as indicated by the arrow.

It will be understood that the sanding devices 35f and 35r are of conventional type and no description thereof is accordingly deemed necessary except to explain that they operate to effect sanding only upon the supply of fluid under pressure thereto.

A pair of sanding reservoirs 36 is provided for each wheel truck 11 and 12, the reservoirs being severally charged with fluid under pressure supplied through a branch pipe 37 of supply pipe 17 under the control of corresponding magnet valve devices 39f and 39r. Magnet valve devices 39f and 39r are of the well-known double-beat valve type and accordingly a functional description only is deemed necessary. When the magnet winding of the magnet valve devices 39f and 39r is deenergized, as it is normally, the magnet valve device establishes communication between the branch pipe 37 and the corresponding sanding reservoir 36 to effect charging thereof. When the magnet winding of the magnet valve devices 39f or 39r is energized, the reservoir charging communication is closed and a supply communication is opened between each reservoir 36 and the corresponding sanding devices 35f or 35r, thus causing sanding.

The volume of the sanding reservoirs 36 is such that the fluid therein is sufficiently reduced in pressure in a certain time, such as ten or fifteen seconds, after the magnet valve device associated therewith is energized, so that sanding is automatically stopped notwithstanding continued energization of the magnet valve devices 39f or 39r.

According to my invention, the equipment further includes electrical apparatus for registering the rate of rotative deceleration of individual pairs of vehicle wheels and adapted to control the sanding magnet valves 39f and 39r so as to effect sanding, as well as to effect operation of the valve mechanisms 31 of the corresponding wheel-truck to effect release of the brakes on that truck.

This electrical apparatus is diagrammatically shown as comprising a generator 41 of the direct-current type for each axle 14, each generator being arranged to be driven by rotation of the axle so as to produce a voltage which is substantially proportional to the speed of rotation of the axle and the wheels affixed thereto. The generator 41 may be so mounted in the journal housing at one end of an axle that the rotary shaft of the generator 41 is coupled to the end of the axle in coaxial relation or any other suitable arrangement may be employed.

Associated with each generator 41, in a manner presently more fully described, are an electrical condenser 42, a full-wave rectifier 43 of the dry disk or copper-oxide type, and a pair of current-responsive relays 44 and 45, hereinafter respectively designated the sand control relay and brake control relay.

As will be apparent, the brush terminals of each generator are connected by suitable wires across the input terminals of the corresponding rectifier 43 with the condenser 42 in series-circuit relation. The two relays 44 and 45 are connected in series-circuit relation across the output terminals of the rectifier 43.

The arrangement of each generator 41 and its associated condenser 42, rectifier 43 and relays 44 and 45 is such as to register the rate of rotative retardation of the corresponding vehicle wheels.

It will be understood that when a car wheel 13 rotatively accelerates, the voltage of the corresponding generator 41 increases at a corresponding rate and the condenser 42 is accordingly charged by a charging current that flows through the relays 45 and 44 in succession and which varies in degrees according to the rate of increase of the generator voltage. Conversely, when a car wheel 13 rotatively decelerates, the generator voltage decreases at a corresponding rate and there is, therefore, a discharge flow of current from the condenser 42 through the relays 45 and 44 in succession, the value of the discharge current depending upon and being proportional to the rate of rotative deceleration of the car wheel.

The relays 44 and 45 are conventional relays of either the neutral or uni-directional type and are so designed as to close the single contact members thereof only in response to current in excess of certain different predetermined values, respectively, that correspond to certain selected rates of rotative deceleration or acceleration of the car wheel. As will hereinafter more fully appear, the sand control relay 44 is so designed as to pick up, that is, operate its contact member to closed position only in response to a current corresponding to a rate of rotative deceleration or acceleration of a car wheel exceeding a certain selected rate. The brake control relay 45 is so designed as to pick up only in response to a current corresponding to a rate of rotative deceleration or acceleration which is a predetermined amount higher than that required to cause pick-up of the relay 44. The rate of rotative deceleration of a car wheel required to cause pick-up of the brake control relay 45 is selected at a value which is not attained unless the car wheel is slipping. Since there is a certain maximum rate of rotative deceleration of a car wheel which can be attained without causing the wheel to slip, the rate selected for the pick-up point of the relay 45 is a rate which is in excess of this maximum rate. The rate of rotative deceleration of a car wheel required to cause pick-up of the sand control relay 44 is, however, one which can be obtained without slipping of the car wheel.

The contact members of the two sand control relays 44 for the front wheel-truck 11 are connected in parallel relation so that either may control another relay hereinafter designated the sand relay 46. The contact members of the brake control relays 45 of the front wheel-truck 11 are similarly connected in parallel relation so that either may control another relay hereinafter designated the brake relay 47.

In a similar manner, the contact members of the two sand control relays 44 for the rear wheel-truck 12 are connected in parallel relation so that either may control a corresponding sand relay 46 and the contact members of the two brake control relays 45 for the rear wheel-truck 12 are connected in parallel relation so that either may control a corresponding brake relay 47.

Each sand relay 46 has two contact members 46a and 46b which are biased to open position when the relay is deenergized and which are actuated to closed position when the relay is energized.

In a similar manner each brake relay 47 is provided with two contact members 47a and 47b, both contact members being biased to open position when the relay is deenergized and being actuated to closed position when the relay is energized.

The respective functions of the relays 46 and 47 will be made apparent hereinafter.

The apparatus shown further comprises a fluid pressure operated switch device 51 of standard construction which is adapted to be operated from an open position to a closed position only when the pressure in the control pipe 18 exceeds a certain low pressure such as five pounds per square inch. In addition two other fluid pressure operated switch devices 52f and 52r are provided, the switch device 52f being responsive to the pressure in the brake cylinders 29 for the front wheel-truck 11 and the pressure switch 52r being operatively responsive to the pressure in the brake cylinders of the rear wheel-truck 12. The pressure switches 52f and 52r are similar in construction to the pressure switch 51 but are designed so as to be operated from closed position to open position when the operating pressure reduces below a certain value, such as fifteen pounds per square inch. As will hereafter appear, the brake cylinder pressure below which switches 52f and 52r open is so selected as to insure the acceleration of a slipping wheel back toward vehicle speed.

The apparatus shown further includes a source of electrical energy, such as a storage battery 55 which is maintained charged by suitable charging equipment not shown. Battery 55 has its terminals connected across the train wires 19 and 20, this connection being normally established by closure of a manually operated switch 56 which may be opened when the car is not in service to prevent accidental and undesired drainage of current from the battery. For convenience, the train wire 19 is hereinafter referred to as the positive battery wire and the train wire 20 is referred to as the negative battery wire.

Associated with the train wires 22 and 23 is a manually operated two-position switch device 58, hereinafter called the direction selector switch, which is effective in one position to connect the positive battery wire 19 to only the wire 22, hereinafter designated the forward sanding wire, and in the other position to connect the positive battery wire 19 to only the wire 23, hereinafter referred to as the reverse sanding wire. As will be made apparent hereinafter, the electromagnet windings of the sanding magnet valves 39f and 39r are connected to the forward sanding wire 22 and reverse sanding wire 23 respectively and are thus selectively energized under the control of the sand relay 46 depending upon the position of the switch 58. Switch 58 is operated by the operator to its forward or reverse position in accordance with the direction of travel of the car.

A pair of indicating lamps 59 and 60 are also provided. Indicating lamp 59 is connected across the wire 21, hereinafter referred to as the indicating wire, and the negative battery wire 20 and is illuminated whenever a brake relay 47 on the car or train is operated in response to a wheel-slip condition. The indicating lamp 60 is connected across the wire 24, hereinafter referred to as the common sanding wire, and the positive battery wire 19 and is illuminated whenever a sand relay 46 is operated.

Before describing the operation of the apparatus, it is believed that further description of the brake valve 28 and of the valve mechanism 31 will be helpful. Brake valve 28 is of the type described and claimed in Patent 2,042,112 of Ewing K. Lynn and Rankin J. Bush and a detailed description thereof is accordingly deemed unnecessary. Briefly, however, the brake valve 28 has an operating handle 28a that is shiftable rotarily in a horizontal plane to operate a rotary shaft of the brake valve device. In the normal or release position of the brake valve handle, valve mechanism of the brake valve device is conditioned to vent the control pipe 18 through the exhaust port 62 of the brake valve. When the brake valve handle is shifted out of its release position into a zone, referred to as the application zone, the brake valve device is operative to supply fluid under pressure to the control pipe 18 to automatically establish a pressure therein which corresponds to the degree of displacement of the brake valve handle out of its release position. If the pressure in the control pipe 18 tends to reduce for some reason, such as leakage, the brake valve 28 is effective to maintain a pressure in the control pipe 18 corresponding to the degree of displacement of the brake valve handle out of its release position.

The valve mechanism 31 is described in detail and claimed in the copending application Serial No. 292,833, of Donald L. McNeal, filed August 31, 1939, and assigned to the assignee of this application. Since reference may be had to the copending application just mentioned for details of the construction of the valve mechanism 31, it is deemed unnecessary to repeat such description herein. Briefly, however, the valve mechanism 31 comprises a relay valve portion 64 and a magnet valve portion 65 secured to a pipe bracket portion 66. The relay valve portion comprises a self-lapping valve mechanism including an operating piston that is subject to the pressure of fluid supplied through branch pipe 32 of control pipe 18. The relay valve portion 64 of each valve mechanism 31 is operative according to the pressure established in the control pipe 18 to supply fluid under pressure from a branch pipe 68 of the supply pipe 17 to the brake cylinder pipe 69 leading to the brake cylinders 29 for the corresponding wheel-truck and establish a pressure in the brake cylinders corresponding or proportional to the pressure in the control pipe 18.

The magnet valve portion 65 of the valve mechanism 31 includes a magnet valve device 67. The magnet valve device 67 is effective, when deenergized, to permit the flow of fluid under pressure from the branch pipe 32 to the operating piston of the relay valve portion 64 and, when energized, to cut off the supply of fluid under pressure to and release fluid under pressure from the operating piston of the relay valve portion 64.

In addition, the magnet valve portion 64 includes valve mechanism which is effective, once the magnet valve device 67 is energized, to cause the rate of flow of fluid under pressure from the control pipe 18 to the operating piston of the relay valve portion 64 to be restricted to a lower than normal rate as long as the pressure established in the control pipe exceeds a certain low pressure such as five pounds per square inch.

*Operation of equipment shown in Figure 1*

Let it be assumed that the main reservoir 27 is charged to the normal pressure carried therein, for example one hundred pounds per square inch, and that the supply pipe 17 and sanding reservoirs 36 are correspondingly charged with fluid under pressure. Let it be further assumed that switch 56 is closed so that the battery 55 is connected to the wires 19 and 20; and that the direction selector switch 58 is in its forward position so that the forward sanding wire 22 is energized, that is, connected to positive battery wire 19. Let it also be further assumed that the car is traveling in the left-hand or forward direction, under power or coasting, with the brake valve handle 28a in its normal brake release position so that the brakes on the car are released.

If, now, the operator desires to effect an application of the brakes, he first shuts off the propulsion power if the power is on and then operates the brake valve handle 28a out of its release position into the application zone thereof an amount corresponding to the desired degree of application of the brakes. Control pipe 18 is accordingly charged to a pressure corresponding to the application position of the brake valve handle, for example forty pounds per square inch. The relay valve portion 64 of each of the valve mechanisms 31 is accordingly operative to supply fluid under pressure to the corresponding brake cylinders 29, the pressure established in the brake cylinders corresponding or being proportional to the pressure established in the control pipe 18. The pressure switches 51, 52f and 52r are of course operated to closed position in response to the assumed pressures established in the control pipe and brake cylinders, but such operation thereof is without immediate effect unless either a sand control relay 44 or a brake control relay 45 is energized or picked up in the manner subsequently to be described.

The operator may vary the degree of brake cylinder pressure and, correspondingly, the degree of application of the brakes as desired by merely varying the position of the brake valve handle, the degree of application of the brakes increasing with increased displacement of the brake valve handle from release position and decreasing with decreased displacement of the brake valve handle from the release position.

In order to effect the release of the brakes, the operator merely shifts the brake valve handle 28a back to its release position, thus restoring the control pipe 18 to its normal atmospheric pressure. The relay valve portion 64 of each valve mechanism 31 accordingly operates in response to the reduction of the pressure in control pipe 18 to effect a corresponding reduction of pressure in the associated brake cylinders 29, thus completely venting the brake cylinders and causing release of the brakes.

As long as the rate of rotative deceleration of each pair of car wheels 13 during an application of the brakes does not exceed the certain rate sufficient to cause pick-up of the corresponding sand control relay 44, the sand control relays 44 as well as the brake control relays 45 associated with all the axle-driven generators 41 are not operated.

Let it be assumed, however, that while the car is traveling at a high speed the brakes are applied to a sufficient degree to cause all the car wheels 13 to rotatively decelerate in unison at a rate sufficient to cause substantially simultaneous pick-up of all the sand control relays 44.

Upon the closure of the contact member of each sand control relay 44, a circuit is completed for energizing the sand relay 46 for the corresponding wheel-truck. The individual circuits for energizing the several relays 46 are similar and accordingly only the circuit for the relay 46 for the front wheel-truck will be illustratively described. It will be understood, however, that the same reference numerals are employed to designate corresponding parts of the energizing circuit for all the relays 46 on a car or train. The circuit for energizing the relay 46 for the front wheel-truck extends from the positive battery wire 19 by way of a branch wire 75 including the closed pressure switch 51, wires 76 and 77, through the parallel contact members of the two sand control relays 44, a wire 78, the winding of the relay 46, wire 79 and a branch wire 81 to the negative battery wire 20.

The contact member 46a of each sand relay 46 is effective in its closed position to establish a holding or stick circuit for maintaining the corresponding relay 46 energized thereafter independently of the sand control relays 44 for the corresponding wheel-truck as long as the pressure switch 51 remains in closed position. Taking the relay 46 for the front wheel-truck as an example, this holding circuit extends from the positive battery wire 19 by way of the branch wire 75 and the pressure switch 51, wires 76 and 77, contact member 46a of relay 46, a wire 82, wire 78, winding of the relay 46, wires 79 and 81 back to the negative battery wire 20. Accordingly, once each sand relay 46 is energized, it remains energized thereafter during an application of the brakes notwithstanding the subsequent drop-out of the two associated sand control relays 44 due to a decrease in the rate of rotative deceleration of the car wheels 13.

The contact member 46b of each sand relay 46 is effective in its closed position to establish an individual circuit connecting the common sanding wire 24 to the negative battery wire 20. Taking the relay 46 for front wheel-truck 11 as an example, this circuit extends from the common sanding wire 24 by way of a wire 84, contact member 46b of relay 46, a wire 85, and wires 79 and 81 to the negative battery wire 20.

With the direction selector switch 58 in its "forward" position as previously assumed, the forward sanding magnet valves 39f of front and rear wheel-trucks 11 and 12 are accordingly energized because the magnet winding of each of the magnet valves 39f is connected across the forward sanding wire 22 and the common sanding wire 24. In the case of a train of cars, the magnet valves 39f on all cars will accordingly be energized.

Upon energization of each of the magnet valve devices 39f, fluid under pressure is supplied from the corresponding sanding reservoir 36 to the associated sanding devices 35f and the road surface or rails are accordingly sanded at a point in advance of each of the vehicle or car wheels.

The indicating lamp 60, it will be seen, is energized, when the common sanding wire 24 is connected to the negative battery wire 20 by one or more of the sand relays 46 and thus serves to indicate to the operator that sanding is being effected.

The reverse sanding magnet valves 39r have their magnet windings connected across the reverse sanding wire 23 and the common sanding wire 24. Thus the magnet valve devices 35r are not energized while the vehicle is traveling in a forward direction. If the car is traveling in the opposite or reverse direction, so that the selector switch 58 is correspondingly in its "reverse" position connecting the positive wire 19 to the reverse sanding wire 23, the operation of the sand relay 46 to connect the common sanding wire 24 to the negative battery wire 20 results in energization of the reverse sanding magnet valves 39r instead of the forward sanding magnet valves 39f.

Thus when the rate of retardation of the car wheels exceeds a certain maximum rate, sanding is automatically initiated in order to so improve the coefficient of adhesion or rolling friction between the wheels and the road surface or rails as to tend to prevent slipping or sliding of the car wheels.

As previously indicated, sanding is automatically stopped when the fluid in the sanding reservoirs 36 is depleted. Thus, after a limited time, sanding ceases although the magnet valve devices 39f may remain energized.

If the degree of application of the brakes is sufficiently high to cause a car wheel, for example the wheels of the trailing axle on the front wheel-truck 11, to begin to slip notwithstanding the sanding operation previously described, further operation of the apparatus takes place as follows:

When the car wheels 13 begin to slip, the brake control relay 45 for the corresponding generator circuit is picked-up and a circuit is thereby completed for energizing the brake relay 47 for front wheel-truck 11 as well as the magnet valve device 67 of the corresponding valve mechanism 31. This circuit extends from the positive battery wire 19 by way of the branch wire 75 and pressure switch 51, wires 76 and 77, the contact member of the brake control relay 45 in the circuit corresponding to the slipping wheel, a wire 87 to a point 88 where the circuit divides into two parallel branches, the one branch including the winding of the brake relay 47 and the other branch including the winding of the magnet valve device 67 of the valve mechanism 31, the two branch circuits rejoining at the wire 81 and returning to the negative battery wire 20.

When the brake relay 47 for the front wheel-truck 11 is picked-up, the consequent operation of the contact member 47a thereof to its closed position establishes a holding circuit therefor which is maintained as long as the associated pressure switch 52f is in closed position. The contact member 47a and the pressure switch 52f are connected in series relation in a wire 91 that connects the wire 76 to wire 87 at the point 88 so that when the relay 47 is picked-up while the pressure switch 52f is closed, the contact members of the brake control relays 45 are shunted or paralleled. Thus, once the brake relay 47 is picked-up by operation of a brake control relay 45, the brake relay 47 and the magnet winding of the magnet valve device 67 of the valve mechanism 31 for the corresponding wheel-truck are maintained energized thereafter as long as the pressure switch 52f for the corresponding wheel-truck remains closed.

The contact member 47b of the brake relay 47 is effective in its closed position to connect the positive battery wire 19 to the indicating wire 21. This accordingly effects energization of the indicating lamp 59. Thus whenever a car wheel begins to slip, the indicating lamp 59 is illuminated and informs the operator of this condition.

Upon the energization of the magnet valve device 67 of the valve mechanism 31, fluid under pressure is rapidly released from the operating piston in the relay valve portion 64 of the corresponding valve mechanism 31 and, accordingly, fluid under pressure is rapidly released from the brake cylinders 29 for the corresponding wheel-truck. It should be observed that the slipping of a wheel or pair of wheels on a given wheel-truck effects only the release of the brakes on the corresponding wheel-truck and does not effect the release of the brakes on other wheel-trucks on the same car or on other cars of a train.

When the pressure in the brake cylinders 29 is reduced to below a value, such as fifteen pounds per square inch, the pressure switch 52f is operated to open position and thereby interrupts the holding circuit for the corresponding brake relay 47 and magnet valve device 67 of the valve mechanism 31. Due to the rapid reduction of the pressure in the brake cylinders 29 to a low value in response to the initiation of slipping of one of the pairs of car wheels on the front wheel-truck, the slipping wheels cease to decelerate and then accelerate back toward a speed corresponding to the vehicle speed. The time required for the slipping car wheels to return to vehicle speed is shorter than the time required to reduce the pressure in the brake cylinder sufficiently to open the pressure switch 52f, so that when the pressure switch 52f does open, the brake control relay 45 associated with the slipping wheel or pair of wheels is not closed because the wheel is not slipping at that time. Consequently, upon the interruption of the holding circuit for the relay 47 and the magnet valve device 67 of the valve mechanism 31 due to opening of the pressure switch 52f, the relay 47 and the magnet valve device 67 become deenergized.

It will be understood that since a slipping wheel accelerates back toward a speed corresponding to vehicle speed at a rate sufficient to cause pick-up of relays 44 and 45, these relays are momentarily operated to closed position during such time. However, as previously indicated, this operation is without effect.

The deenergization of the brake relay 47 causes the indicating lamp 59 to be extinguished because the contact member 47b is returned to open position. At the same time, the opening of the contact member 47a prevents the establishment of the holding circuit for relay 47 due to the subsequent closure of the pressure switch 52f unless the brake control relay 45 for either axle of the front wheel-truck is again picked-up due to a subsequent slipping of the wheels on that truck.

When the magnet valve device 67 of the valve mechanism 31 becomes deenergized as just described, communication is established through which fluid under pressure is resupplied to the operating piston of the relay valve portion 64 in the valve mechanism 31. However, as previously indicated, the magnet valve portion 65 is conditioned so as to restrict the rate of supply of fluid under pressure to the relay valve portion 64 at this time and consequently the relay valve portion 64 is operative to resupply fluid under pressure to the brake cylinder 29 at a correspondingly restricted rate, thereby minimizing the possibility of a repetition of the slipping of the wheels.

Should the wheels begin to slip a second time, which is unlikely, the valve mechanism 31 is again operated, in response to pick-up of the brake control relay 45 to rapidly release fluid under pressure from the brake cylinders 29 on only that truck having the slipping wheels, and then, after the pressure in the brake cylinders has been sufficiently reduced, cause resupply of fluid under pressure to the brake cylinders at a restricted rate.

Thus at no time are the car wheels permitted to reach a locked condition and slide.

When the car or train comes to a complete stop, due to the application of the brakes, sanding has already ceased due to the depletion of the limited supply of fluid under pressure in the sanding reservoirs 36. Accordingly, the car may remain stopped for an indefinite time before again starting, without unnecessary consumption of sand.

When the operator returns the brake valve handle 28 to its release position to release the brakes prior to again starting the car or train, the pressure switches 51 on each car are opened and thus the holding circuit for each of the sand relays 46 is automatically interrupted and the relays are dropped-out or opened. The sanding magnet valve devices 39f or 39r, depending upon which were energized, are accordingly deenergized to restore the charging communication from branch pipe 37 to the sand reservoirs 36.

As previously described, all the sand control relays 44 are picked-up substantially simultaneously to cause a sanding operation, without the car wheels actually beginning to slip, because all wheels are uniformly retarded at a certain rate of retardation. It will be seen, however, that if the car or train is being retarded by a brake application at a rate which is less than a rate sufficient to pick-up the sand control relays 44 and an individual pair of car wheels being to slip, then the sand control relay for the slipping wheels will be picked-up in response to the slipping of the wheels because, while slipping, the wheels rotatively decelerate at a rate sufficient to pick-up first the sand control relay 44 and then the brake control relay 45.

When an individual sand control relay 44 is picked-up, the energization of the sand relay 46 of the corresponding wheel-truck results in the connection of the common sanding wire 24 to the negative battery wire 20 in the same manner as previously described. Accordingly, depending upon the direction selector switch 58 being in the "forward" or "reverse" position thereof, the forward or reverse sanding magnet valves 39f and 39r throughout the car or train are energized and sanding effected throughout the car or train notwithstanding that the rate of rotative deceleration of the car wheels on wheel-trucks other than a wheel-truck having the slipping wheels may be less than sufficient to cause pick-up of the corresponding sand control relays 44 and sand relay 46. The possibility of the slipping of the wheels on trucks other than that having the slipping wheel is thus guarded against by improving the adhesion between the wheels and rails by sanding.

In order to permit the operator to effect sanding at any time, such as when starting the car, a manually operated switch 93 is provided in parallel relation with the contact member 46b of each sand relay 46. Switch 93 is normally biased to open position and is operative by the operator to closed position. The effect of closure of the switch 93 is the same as the closure of the contact member 46b of the sand relay 46, namely the connection of the common sanding wire 24 to the negative battery wire 20. Accordingly, depending upon whether the forward or the reverse sanding wires 22 and 23 are energized, the forward or reverse sanding magnet valves 39f and 39r are selectively energized upon the closure of the switch 93 to cause sanding throughout the car or train.

Figure 2:
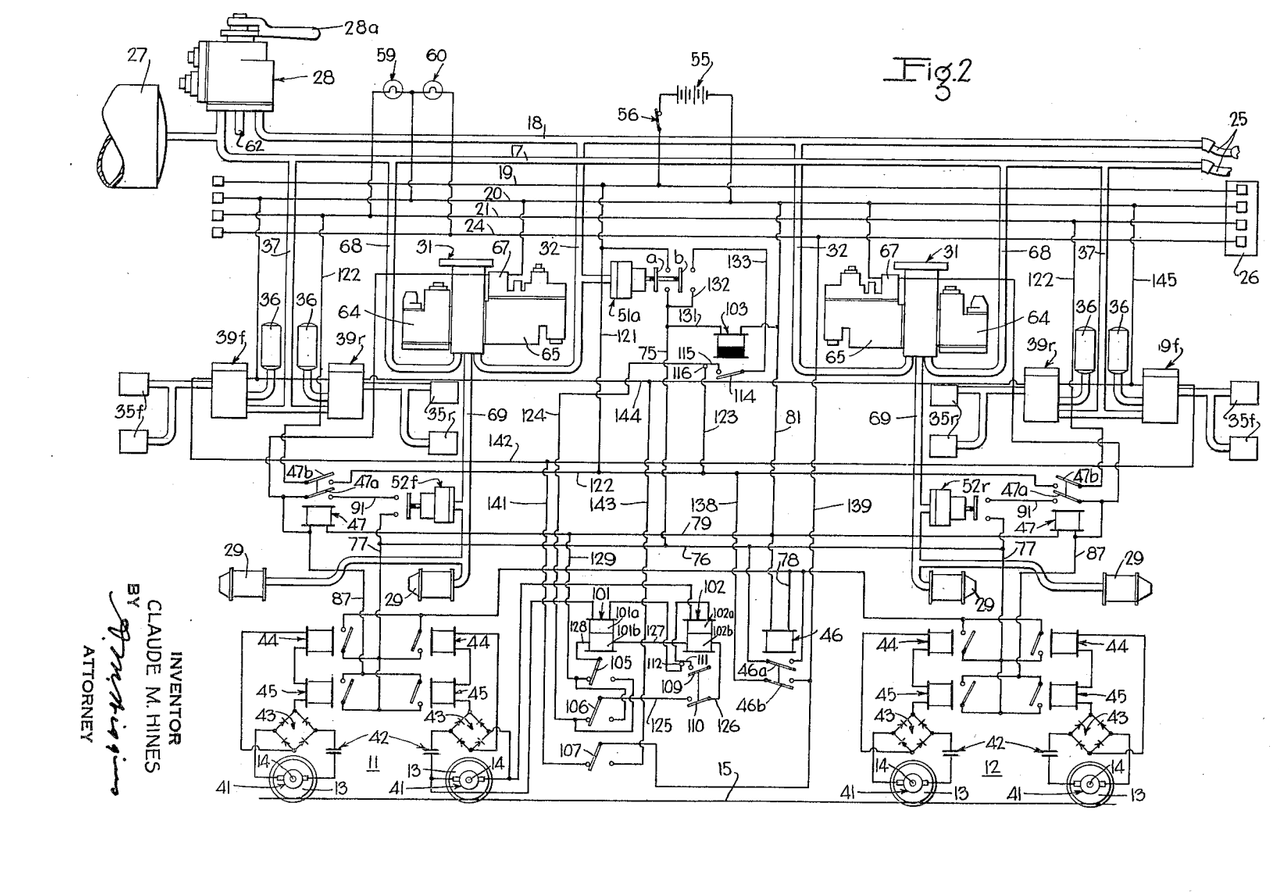
Fig. 2 is a diagrammatic view showing a modification of the apparatus shown in Fig. 1, characterized by means for automatically effecting directional control of sanding as distinguished from the manual control shown in Fig. 1.

*Embodiment shown in Figure 2*

The apparatus shown in Fig. 2 duplicates that shown in Fig. 1 in many respects and the description of Fig. 2 will therefore be limited to the features and parts which differ from the apparatus of Fig. 1, it being understood that corresponding parts of the two figures have the same reference numerals.

Briefly, the apparatus shown in Fig. 2 differs from that shown in Fig. 1 in having means for automatically conditioning the control circuits for the sanding magnet valves 39f and 39r according to the direction of travel of the car or train so that the sand is always deposited in advance of the wheels of the car or train. This automatic directional sanding control means includes two so-called directional relays 101 and 102 and another relay 103.

There are other differences between the apparatus of Fig. 2 and that of Fig. 1 which may also here be briefly pointed out. Thus, instead of having two sand relays 46, one for each wheel-truck of a car, only one sand relay 46 is provided in Fig. 2. The sand control relays 44 for both wheel-trucks 11 and 12 are arranged with their contact members in parallel relation so that the pick-up of any of the sand control relays 44 will cause energization of the single sand relay 46.

The apparatus shown in Fig. 2 differs further from that of Fig. 1 in omitting the forward and reverse sanding wires 22 and 23, such wires not being required due to the provision of the automatic directional sanding control means including the relays 101, 102, and 103. Also in place of the pressure switch 51, a pressure switch 51a is provided which differs from the pressure switch 51 in that it has two insulated contact-bridging members a and b, each adapted to engage associated contact members.

Considering the relays 101, 102 and 103 in greater detail, relay 101 is of the polarized type having two coils 101a and 101b and an armature having three contact members 105, 106 and 107. The coil 101a is a pick-up coil whereas the coil 101b is a holding coil. Flow of current through the coil 101a in one direction effects actuation of each of the contact members 105, 106 and 107 to a corresponding one of two positions respectively and flow of current in the opposite direction causes operation of each of the contact members to the other position. Flow of current through coil 101b in a direction corresponding to that through coil 101a is effective to hold the contact members of the relay in the corresponding actuated position.

Relay 102 is of the neutral type having two coils 102a and 102b which, as will hereinafter be seen, are the pick-up coil and the holding coil respectively. Relay 102 is provided with two contact members 109 and 110. The contact member 110 is biased to open position when the relay coils are deenergized, is actuated to a closed position when the pick-up coil 102a is energized, and held in picked-up position when the holding coil 102b is energized. The contact member 109 is effective in its picked-up position to bend a flexible contact finger 111 out of contact with a stationary contact member 112. The arrangement of the contact members 110 and 109 is such that the contact member 110 is actuated to closed position before the contact member 109 effects disengagement of the contact finger 111 from the contact member 112. The reason for this arrangement will be made apparent presently.

Relay 103 is a conventional relay of the slow-release type having a single contact member 114 which is biased to open position after a certain time interval elapses following deenergization of the relay coil and which is actuated promptly to a closed position when the relay coil is energized. The arrangement of the contact member 114 of relay 103 is similar to that of the contact member 109 of relay 102 in that when the relay coil is energized, the contact member 114 engages and shifts a contact finger 115 out of engagement with a stationary contact member 116 which it normally engages.

The pick-up coils 101a and 102a of the directional relays 101 and 102 respectively are arranged in series relation in a circuit connected across the brush terminals of one of the axle-driven generators 41, as for example, the trailing axle of the front wheel-truck 11 which circuit also includes the switch formed by the engagement of the contact finger 111 and contact member 112 of the relay 102.

In operation, assuming that the brake valve handle 28a is in its release position so that the pressure switch 51a has its two contact members a and b in open position, the pick-upcoils 101a and 102a of the relays 101 and 102 respectively are energized by current flowing in a direction corresponding to the polarity of the voltage produced at the brush terminals of the generator 41 associated with the car wheels the instant the car wheels start to rotate in the direction of travel.

In Fig. 2, it is assumed that the polarity of the voltage produced at the brush terminals of the generator 41 associated with the trailing axle of the front wheel-truck 11 is such as to cause the contact members 105, 106 and 107 of the relay 101 to be actuated in the left-hand direction to the position shown when the car travels in the forward direction. When the direction of travel of the car is reversed and the polarity of the voltage at the brush terminals of the generator 41 is thus reversed, contact members 105, 106 and 107 of relay 101 are actuated in the right-hand direction to the position opposite that in which they are shown.

The pick-up coil 101a of relay 101 is responsive to a lower current than pick-up coil 102a of relay 102 and thus when current is first built-up in the pick-up circuit, the polarized relay 101 is first actuated to the position corresponding to the direction of travel of the car before relay 102 is picked-up.

When the relay 102 is picked-up, the contact member 110 of relay 102 is first shifted to closed position and then contact finger 111 is shifted out of engagement with the contact member 112, thus sequentially establishing a circuit for energizing the holding coils 101b and 102b of the relays 101 and 102 and interrupting the circuit for energizing the pick-up coils 101a and 102a.

The holding circuit for the relay coils 101b and 102b extends from the positive battery wire 19 by way of the branch wire 121, wires 122 and 123, contact member 116 and contact finger 115 of the relay 103, wire 124, contact member 106 of the directional relay 101, a wire 125, contact member 110 of relay 102, a wire 126, holding coil 102b of the relay 102, a wire 127, holding coil 101b of the relay 101, a wire 128, contact member 105 of the relay 101, and a wire 129 to the wire 79 which is connected by the branch wire 81 to the negative battery wire 20 as in Fig. 1.

It will thus be apparent that the relays 101 and 102 are electrically locked in the position corresponding to the direction of travel of the car substantially at the instant that the car starts to move. It will, furthermore, be observed that contact members 105 and 106 of the relay 101 are reversing contacts that function to cause flow of current through the holding coils of the two relays 101 and 102 in a direction such that the direction of magnetic flux in the core of the relays due to the holding coils is the same as that due to the pick-up coils. It will be seen that this prevents the undesired dropping-out or change of position of the relay contacts.

Whenever an application of the brakes is initiated by operation of the brake valve handle 28a and the control pipe 18 is correspondingly charged with fluid under pressure, pressure switch 51a is actuated to closed position. Upon the actuation of the contact-bridging member a of pressure switch 51a to its closed position, a circuit is completed for energizing the coil of the relay 103. This circuit extends from the positive battery wire 19 by way of the wire 121, wire 75 including the contact member a of the pressure switch 51a, a branch wire 131, coil of the relay 103, and wire 81 to the negative battery wire 20. Upon energization of the relay 103, the contact member 114 thereof is first actuated into engagement with the contact finger 115 to establish a second holding circuit for the holding coils 101b and 102b of the directional relays 101 and 102 which is under the control of the pressure switch 51a before interrupting the previously described holding circuit by disengaging the contact finger 115 from the contact member 116.

The relay 103, when energized, accordingly functions to transfer the control of the holding circuit for the directional relays to the pressure switch 51a, the reason being that unless this were done, there would be no means of interrupting the holding circuit and consequently of changing the position of directional relays 101 and 102. It will be apparent that with the relay 103 energized, the holding circuit for the relay coils 101b and 102b extends from the positive battery wire 19 by way of the wires 121 and 75, contact member a of the pressure switch 51a, a branch wire 132, contact member b of the pressure switch 51a, a wire 133, contact member 114, contact finger 115 of the relay 103 and then in the manner previously traced. Obviously the arrangement of the contact member 114, the contact finger 115 and contact member 116 of the relay 103 is such as to establish the holding circuit controlled by the pressure switch 51a before interrupting the initially established holding circuit.

It will be observed that the last-established holding circuit includes the contact members a and b of the pressure switch 51a arranged in series relation. The reason for this arrangement will be made apparent hereinafter.

When one or more pairs of car wheels 13 attain a rotative deceleration rate during application of the brakes sufficient to cause pick-up of the corresponding sand control relays 44, the sand relay 46 is correspondingly picked-up and a holding circuit for maintaining it picked-up thereafter independently of relays 44 is established by contact member 46a thereof just as in the apparatus of Fig. 1.

The circuit whereby the contact member 46b of the sand relay 46 effects energization of the sanding magnet valve devices 39r and 39f differs somewhat from the arrangement shown in Fig. 1. In Fig. 2, the contact member 46b of relay 46 is arranged to close the circuit through a wire 138 that connects the wire 122 to a wire 139 that is, in turn, connected to the common sanding wire 24 and to the contact member 107 of the directional relay 101.

In the position shown, the contact member 107 of relay 101 connects the wire 139 to a wire 141 that is, in turn, connected to a wire 142 leading to corresponding terminals of the forward sanding magnet valves 39f.

When the contact member 107 of the directional relay 101 is in the opposite position to that shown, it connects the wire 139 to a wire 143 that is, in turn, connected to a wire 144 leading to corresponding terminals of the reverse sanding magnet valves 39r. The remaining terminals of the magnet windings of the magnet valve devices 39f and 39r for each wheel-truck are connected by a common wire 145 to the negative battery wire 20.

It should now be apparent that the contact member 46b of the sand relay 46 is effective when closed to effect energization of the forward sanding magnet valve devices 39f or the reverse sanding magnet valve devices 39r, depending upon the position of the contact member 107 of the directional relay 101.

It will be further observed that the contact member 46b of sand relay 46 is effective to connect the positive battery wire 19 to the common sanding wire 24. Accordingly, since the indicating lamp 60 is connected across the common sanding wire 24 and the negative battery wire 20, the closure of the contact member 46b of the sand relay 46 causes the lamp 60 to be illuminated to indicate the sanding operation. At the same time, in the case of a train of cars, the connection of the sanding wire 24 to the positive battery wire 19 causes energization of the forward or reverse sanding magnet valves 39f or 39r on all cars of a train if such energization has not already been effected under the control of the sand control relays 44 on that car.

The operation of the brake control relays 45, the brake relay 47, and pressure switches 52f or 52r of Fig. 2 in controlling the valve mechanisms 31 to effect a rapid release of the brakes and subsequent reapplication of the brakes at a restricted rate when a car wheel begins to slip is the same as previously described in connection with the apparatus shown in Fig. 1 and accordingly need not be repeated.

When the operator effects release of the brakes, prior to again starting the car, the pressure switch 51a is correspondingly restored to open position and the holding circuit, previously described, for the holding coils 101b and 102b of the directional relays 101 and 102 is accordingly interrupted. Relay 103 has a slow release characteristic in order to enable positive interruption of the holding circuit for the relay coils 101b and 102b. Obviously, the coil of the relay 103 is deenergized when the contact member a of the pressure switch 51a is shifted to open position. If the contact finger 115 of the relay 103 reengages the associated member 116 prior to the contact member 110 of relay 103 reaching open position, the holding circuit for the holding coils 101b and 102b would be established and the relay coils would not be deenergized. It is, therefore, necessary that the contact member 110 of the relay 102 open before the contact member 115 of the relay 103 engages its contact member 116 and relay 103 accordingly has a slow-release characteristic.

The contact member b of the pressure switch 51a is provided in order to prevent a fluttering or pumping of the contact member of relay 103. It will be observed that the contact finger 115 of relay 103 momentarily connects the contact member 116 and the contact member 114 of the relay 103 upon deenergization of the relay and, therefore, if contact member b of pressure switch 51a were not provided to previously disconnect wires 132 and 133 a circuit would be established for re-energizing the relay 103. This circuit would extend from positive battery wire 19 by way of branch wire 121 and wires 122 and 123, serially through contact member 116, contact finger 115 and contact member 114 of relay 103, wires 133, 132, 75 and 131, winding of relay 103, and wire 81 back to the negative battery wire 20. Upon energization of the relay, the latter would be interrupted and the relay would again endeavor to open. This repeated energization and deenergization of the relay 103 would produce a fluttering or vibration of the contact member 114 of the relay which would interfere with the proper operation of the directional relays 101 and 102. The purpose of the contact member b of the pressure switch 51a is, therefore, to interrupt the possible reenergizing circuit, before it can be established by the relay contact members, and thus prevent the undesired fluttering or successive energization or deenergization of the relay 103 upon the release of the brakes.

When the circuit for energizing the holding coils 101b and 102b of the relays 101 and 102 is interrupted in the manner previously described, the contact members 111 and 112 of the relay 102 become reengaged, thus enabling energization of the pick-up coils 101a and 102a when the car again starts to move and the wheels 13 again start to rotate in the direction of travel of the car.

The relay 101 is so constructed that the contact members 105, 106 and 107 thereof remain in one or the other positions thereof unless the current in the pick-up coil 101a is reversed. Thus, if the car or train again starts to move in the same direction as previously, the contact members 105, 106 and 107 do not change position. If the car starts to move in the opposite direction, however, the polarity of the voltage at the brush terminals of the generator 41 is reversed and consequently the direction of flow of current through the pick-up coil 101a of the directional relay 101 is reversed, thereby causing the contact members 105, 106 and 107 of the relay 101 to be shifted to the position opposite to that in which they are shown.

As in the previously described instance, the energization of the pick-up coil 102a of the relay 102 causes completion of a holding circuit including the holding coils 101b and 102b and then interruption of the circuit including the pick-up coils 101a and 102a. It will be observed, however, that due to the operation of the contact members 105 and 106 of the relay 101 to a position opposite to that which they are shown, the direction of flow of current in the holding circuit is reversed. The magnetic flux set up by the holding coils is thus in the same direction as that set up by the pick-up coils and accordingly undesired drop-out of the relays cannot occur.

It will, therefore, be seen that relay 101 is automatically positioned in accordance with the direction of travel of the car so as to selectively control the energization of the sanding magnet valves 39f and 39r when the sand relay 46 is actuated to its closed position.

Figure 3:
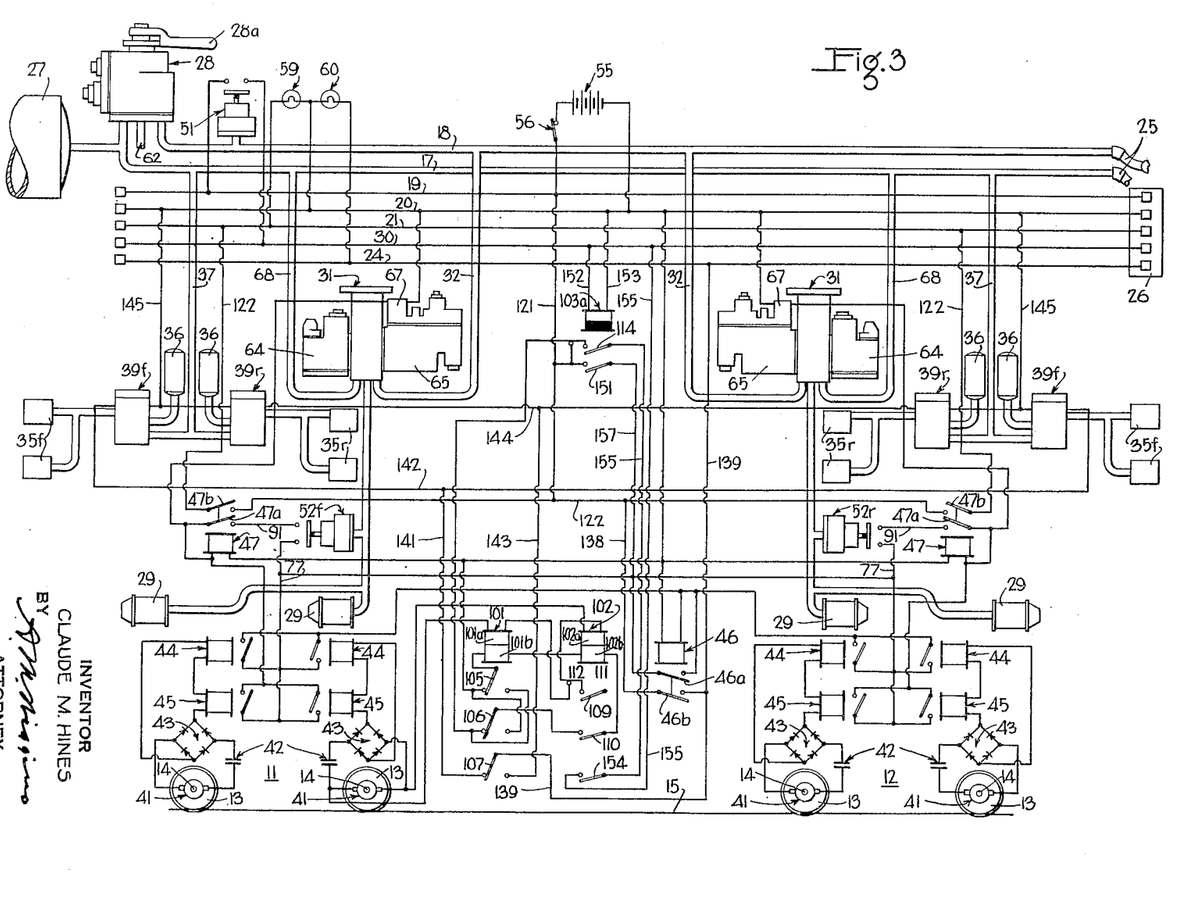
Fig. 3 is a diagrammatic view showing a modification of the apparatus shown in Fig. 2.

*Embodiment shown in Figure 3*

The apparatus shown in Fig. 3 differs in certain respects from the apparatus shown in Fig. 2. It is accordingly deemed sufficient to describe only those features of the apparatus which differ from the apparatus shown in Fig. 2, corresponding parts in the two figures being designated by the same reference numerals without further description.

The apparatus of Fig. 3 differs from that of Fig. 2 in having, in addition to the four train wires 19, 20, 21 and 24 of Fig. 2, an additional train wire 30 hereinafter called the relay wire. A pressure switch 51, identical with the pressure switch 51 of Fig. 1, is provided and is similarly controlled according to the pressure in control pipe 18. When closed, pressure switch 51 connects positive battery wire 19 to the relay wire 30.

In place of the relay 103 of Fig. 2, a relay 103a differing slightly from the relay 103 is provided in Fig. 3. Relay 103a, like the relay 103, is of the slow-release type and differs from the relay 103 in having an additional contact member 151 which is actuated to closed position upon energization of the relay coil. The coil of the relay 103a is connected by wires 152 and 153 across the relay wire 30 and the negative battery wire 21. Thus, whenever the pressure switch 51 is closed, the relay 103a is energized.

In the case of a train of cars, only one pressure switch 51 located on one car, such as the power car, is accordingly required because the relay 103a on each car is adapted to perform the necessary functions, as will hereinafter appear.

The operation of the directional relays 101 and 102 in Fig. 3 is substantially the same as in Fig. 2 except that the circuit for energizing the holding coils 101b and 102b of the relays 101 and 102 respectively includes the pressure switch 51 and an additional contact member 154 of the relay 102. Contact member 154 of relay 102 is biased to an open position when the relay coils are deenergized and is actuated to a closed position when the relay coils are energized. The contact member 154 of the relay 102 closes the circuit through a wire 155 that connects the relay wire 30 to the contact member 114 of the relay 103a.

It will thus be seen that the contact member 154 of relay 102 serves the same purpose as the contact member b of the pressure switch 51a of Fig. 2, namely it prevents the fluttering of the relay 103a when the brakes are released.

The contact member 151 of the relay 103a is effective in the closed position thereof to complete the circuit through a wire 157 that connects the branch wire 121 of the positive battery wire 119 to the contact member 46a of the sand relay 46. Thus when the sand relay 46 is picked-up during an application of the brakes, the holding circuit for the sand relay 46 is established by way of contact member 151 of the relay 103 and the contact member 46a of the relay 46. Since the relay 103a is deenergized in response to the opening of the pressure switch 51 which occurs when the pressure in the control pipe 18 is reduced to atmospheric pressure to effect release of the brakes, it will be seen that the holding circuit for the sanding relay 46 is interrupted by contact member 151 of the relay 103a.

The operation of the sand control relays 44 to cause selective operation of the sanding magnet valves 39f and 39r, and operation of the brake control relays 45 to cause valve mechanisms 31 to effect a rapid release of the brakes is the same as that previously described in connection with the apparatus shown in Fig. 2 and thus needs no description.

Figure 4:
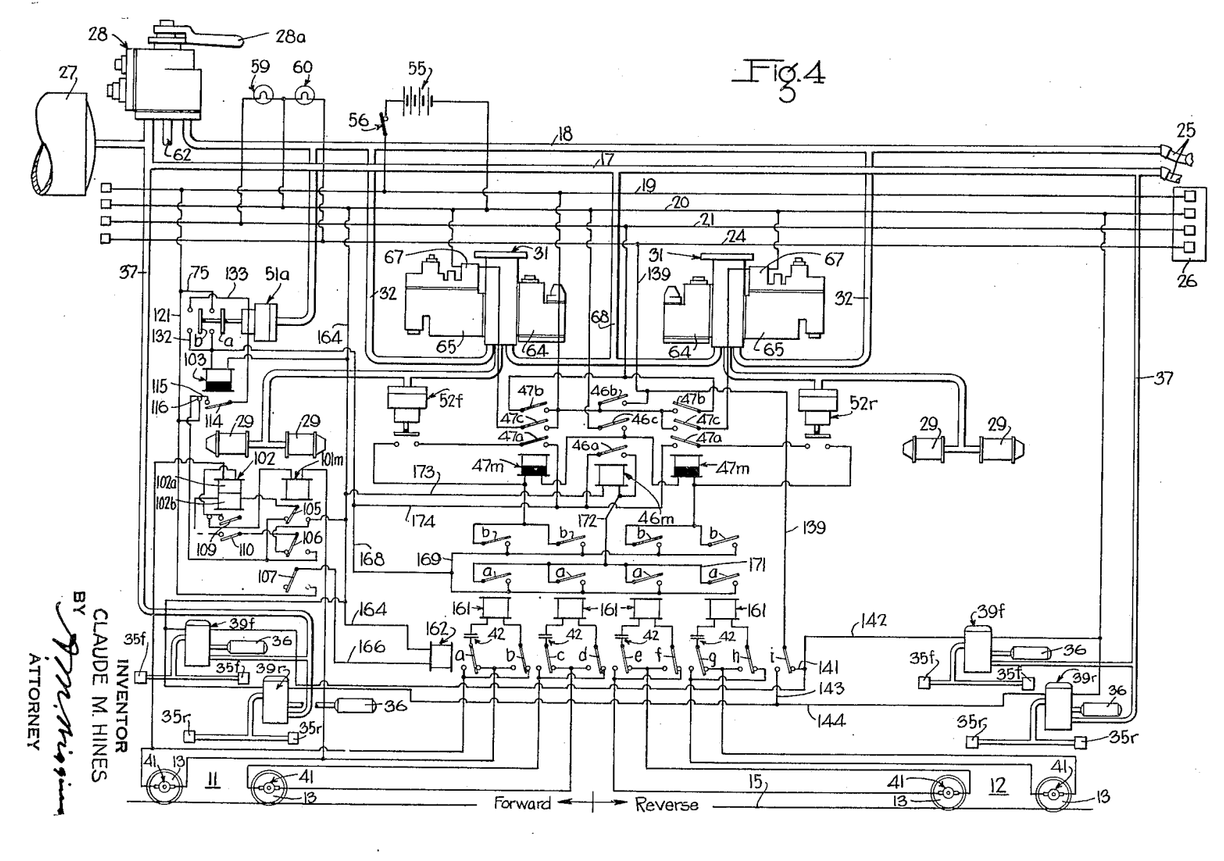
Fig. 4 is a diagrammatic view showing another apparatus adapted to perform functions similar to those performed by the apparatus disclosed in the foregoing figures.

*Embodiment shown in Figure 4*

The apparatus shown in Fig. 4 is similar in many respects to the apparatus shown in Fig. 2 and accordingly corresponding parts are designated by the same reference numerals without further description. It is deemed necessary, therefore, merely to point out and describe those features of the apparatus shown in Fig. 4 which differ from the apparatus of Fig. 2.

Essentially, the apparatus shown in Fig. 4 differs from that shown in Fig. 2 in having a generator or condenser circuit for each axle of the car or train which includes only a single relay 161, hereinafter called the control relay, instead of the series-related sand control relay 44 and brake control relay 45. At the same time, a reversing relay 162 is provided in place of the rectifier 43 of Fig. 2 for controlling the connections between each axle-driven generator 41 and the corresponding control relay 161 so as to automatically cause uni-directional flow of discharge current from the condenser 42 in the circuit upon rotative retardation of the car wheels 13, notwithstanding a reversal of direction of rotation of the car wheels and the consequent change of polarity of voltage at the generator brush terminals.

The reversing relay 162 is under the control of a directional relay 101m of the polarized type which differs from the directional relay 101 of Figs. 2 and 3 in that it has only a pick-up coil and does not have a holding coil. The holding coil is not provided in relay 101m because the relay is adapted to hold its contact members in a position corresponding to the direction of flow of current when last energized and such position cannot be changed except upon reversal of energizing current.

The pick-up and holding circuits for the directional relay 101m and its accompanying relay 102 are the same as in Figs. 2 and 3 except that, due to the omission of a holding coil corresponding to the holding coil 101b of directional relay 101, such coil is not included in the holding circuit.

The pick-up coil 102a and the coil of the relay 101m are, furthermore, arranged in series-circuit relation across the brush terminals of the generator 41 associated with the leading axle of the front wheel-truck for purposes of illustration, it being understood that the relays 101m and 102, may be connected across the brush terminals of any of the axle-driven generators for any one car in a train of cars.

The arrangement of the directional relays 101m and 102 is such that when the car is traveling in a forward direction, the contact members 105, 106 and 107 of the directional relay 101m are biased to the position shown, that is, the left-hand position, and when the car is traveling in the reverse direction, the contact members of relay 101m are actuated to the opposite position, that is, the right-hand position.

Intead of controlling the circuit of the sanding magnet valves 39f and 39r directly, as in Fig. 2, the contact member 107 of relay 101m in Fig. 4 does so indirectly by controlling the energizing circuit of the coil of the reversing relay 162 which, in turn, controls the sanding magnet valves 39f and 39r. As will be observed in Fig. 4, one terminal of the coil of the reversing relay 162 is connected by a wire 164 to the negative battery wire 20 while the opposite terminal of the coil is connected by a wire 166 to the contact member 107 of the relay 101m. As long as the contact member 107 remains in the left-hand position shown, which corresponds to the forward direction of travel of the car, the coil of the relay 162 remains deenergized and the contact members of the relay 162 remain in the position shown. When the contact member 107 of the relay 101m is in the position opposite to that shown, that is, in the right-hand position, it connects the wire 166 to the branch wire 121 of the positive battery wire 19, thus establishing a circuit for energizing the coil of the relay 162.

The reversing relay 162 is provided with nine two-position contact members designated a, b, c, d, e, f, g, h and i respectively.

In the deenergized condition of the relay 162, the contact members a to h control the axle-driven generator circuits so that the discharge current from the condenser 42 in each circuit flows in a certain direction through the control relay 161 associated therewith. When the relay 162 is energized, each of the contact members a to h is actuated to the other of its two positions to reverse the connections from the corresponding generator to the condenser and control relay associated therewith, so that upon rotative deceleration of the corresponding car wheels, the discharge current from the condenser flows in the same direction through the control relay 161.

The contact member i of the reversing relay 162 serves the same function as the contact member 107 of the directional relay 101 in Fig. 2, namely, the selective control of the sanding magnet valves 39f and 39r.

The control relays 161 are of the polarized type, each of the relays having two contact members a and b, respectively, that are both actuated from an open position to a closed position when the relay coil is energized by a condenser discharge current in excess of a certain value and corresponding to a certain rate of rotative deceleration of the corresponding car wheels occurring only when the wheels slip.

The contact members a and b of the control relays 161 remain in their closed positions once they are actuated thereto and are restored to their open positions only when the direction of flow of current through the relay coil is reversed. Such reversal takes place only when the corresponding wheels accelerate because the current in the circuit is then in a direction to charge the associated condenser 42.

The contact members a of all of the control relays 161 are arranged in parallel relation so that the closure of any of the contact members is effective, subject to prior closure of the contact member a of the pressure switch 51a, to complete a circuit for energizing a sand relay 46m.

The contact members b of two of the control relays 161, corresponding to the front wheel-truck, are connected in parallel relation in a manner so as to be effective upon closure of either of the contact members and the prior closure of contact member a of the pressure switch 51a, to complete a circuit for energizing a brake relay 47m of the slow pick-up type. Contact members b of the control relays 161 for the rear wheel-truck are similarly connected in parallel relation to each other so as to be effective, with the contact member a of the pressure switch 51a in closed position, to complete a circuit for energizing another brake relay 47m corresponding to the rear wheel-truck.

Relay 46m differs from the relay 46 of Fig. 2 in having, in addition to the contact members 46a and 46b, an additional contact member 46c which, like the other contact members 46a and 46b, is in open position when the relay is deenergized and is actuated to closed position when the relay is energized.

The contact member 46a of relay 46m functions to establish a holding circuit subject to contact member a of pressure switch 51a just in Fig. 2. The contact member 46b of relay 46m is effective when closed to connect positive battery wire 19 to the wire 139, which is connected to the common sanding wire 24 and to contact member i or the reversing relay 162, so as to cause energization of the sanding magnet valves 39f or 39r depending upon the position of the contact member i of the reversing relay 162 on all cars of the train.

Contact member 46c of the relay 46m is an interlock contact so arranged in the energizing circuit for the two brake relays 47m on each car as to prevent energization of the relays 47m in response to the closure of the contact members b of the corresponding control relays 161 unless the contact member 46c is in closed position.

The brake relays 47m differ from the brake relay 47 of Fig. 2 in having, in addition to the contact members 47a and 47b, a third contact member 47c and in being of the slow pick-up type. Thus, when the coil of either relay 47m is energized, a certain time interval of delay elapses before the contact members 47a, 47b and 47c are actuated from open position to closed position.

The contact member 47a of each of the relays 47m is arranged in a holding circuit with the corresponding pressure switch 52f or 52r in the same manner as is the contact member 47a of the relay 47 to maintain the relay 47m energized, once the contact members are actuated to closed position, as long as the pressure switch 52f or 52r remains closed.

The contact member 47b of each of the relays 47m is effective when in closed position to connect the positive battery wire 19 to the indicating wire 21, thus causing energization of the indicating lamp 59 just as in Fig. 2.

The contact member 47c of each relay 47m is effective when closed to complete a circuit for connecting the magnet winding of the magnet valve device 67 of the corresponding valve mechanism 31 across the positive and negative battery wires 19 and 20 to effect energization thereof.

*Operation of apparatus shown in Figure 4*

Assuming that a car having the brake control apparatus shown in Fig. 4 is at a standstill, that the brakes are released and that the operator causes the propulsion motors of the car to start to move the car in the direction desired, the reversing relay 162 will be immediately and automatically positioned according to the direction of travel of the car. If the direction of travel of the car is the forward direction, then the relay 162 remains in the position shown in the drawings. If the car starts to move in the reverse direction then relay 162 is actuated to the position opposite that in which it is shown.

Let it now be further assumed that while the car is traveling along the road under power the operator desires to come to a stop and accordingly shuts off the power and effects an application of the brakes. The pressure switch 51a as well as the pressure switches 52f and 52r are correspondingly closed. If the wheels of any axle of the car begin to rotatively decelerate at a slipping rate in response to the application of the brakes, the corresponding control relay 161 is picked-up and the contact members a and b thereof are thus immediately actuated to closed position. Upon the closure of any of the contact members a of any of the control relays 161, a circuit is completed for energizing the sand relay 46m, this circuit extending from the positive battery wire 19 by way of the branch wire 121, wire 75, contact member a of the pressure switch 51a, wire 168, wire 169, contact member a of the control relay 161, wires 171 and 172, coil of the relay 46m, a wire 173 and wire 164 back to the negative battery wire 20.

The contact member 46a of the relay 46m accordingly becomes effective in its closed position to establish a holding circuit for the relay 46m which extends from the positive battery wire 19 to wire 168 as previously traced, then through a wire 174, contact member 46a of the relay 46m, coil of the relay 46m, and wires 173 and 164 to the negative battery wire 20. Thus, once the relay 46m is energized, it remains energized thereafter as long as the contact member a of pressure switch 51a remains in its closed position which it does until the brakes are completely released.

The contact member 46b of the relay 46m establishes a circuit, which is sufficiently obvious to need no specific tracing thereof, for energizing the indicating lamp 60 and the forward sanding magnet valves 39f for both the front and rear wheel trucks 11 and 12, assuming the car is traveling in the forward direction.

With the contact member b of a control relay 161 for the front wheel-truck closed in response to slipping of a wheel or wheels on the truck as assumed, the closure of the contact member 46c of the relay 46m completes a circuit for energizing the brake relay 47m for the front wheel-truck. Due to the fact that none of the wheels on the rear wheel-trucks have slipped, none of the contact members of the control relays 161 for the rear wheel-truck are in closed position and consequently the brake relay 47m for the rear wheel-truck is not energized.

Due to the fact that the brake relay 47m for the front wheel-truck is of the slow pick-up type, the contact members thereof are not actuated to closed positions until a certain time interval elapses following the initiation of energization of the relay coil. Accordingly, if the slipping wheels on the front truck do not continue to decelerate for a time longer than the time required to cause pick-up of relay 47m and begin to accelerate back toward a speed corresponding to car speed within the operating time-delay interval of the relay 47m, the circuit for energizing the relay 47m will be opened due to restoration of the contact member b of the control relay 161 for the slipping wheels to its open position before relay 47m can be picked-up. If, however, the slipping wheels on the front truck continue to decelerate for a time longer than that required to cause pick-up of relay 47m or, in any case do not accelerate within the operating time-delay interval of relay 47m, then, due to the fact that the contact member b of the corresponding relay 161 does not return to its open position soon enough, brake relay 47m of the corresponding truck is picked-up and the contact members thereof thus actuated to their closed positions.

It will thus be understood that depending upon whether or not the slipping wheel or wheels begin to accelerate within a predetermined interval of time following the initiation of the slipping thereof, the sand relay 46m only, or both the sand relay 46m and the brake relay 47m, are picked-up.

When the sand relay 46m is picked-up, sanding is effected on all cars of the train. It will be apparent that the contact member 46b is effective when actuated to its closed position to effect energization of the sanding wire 24 and either the forward or reverse sanding magnet valves 39f and 39r, depending upon the position of the contact member i of the reversing relay 162.

As in previous embodiments, the sanding continues only for a limited time notwithstanding the fact that the coil of relay 46m remains energized.

If both the sand relay 46m and the brake relay 47m are picked-up, then sanding is initiated as previously described in response to the operation of the sand relay 46m and a brake release operation is also effected in response to the operation of the brake relay 47m. It will be apparent that the contact member 47a of the brake relay 47m corresponding to the slipping wheel or wheels is effective in its closed position to establish a holding circuit for the relay 47m subject to the opening of the pressure switch 52f. It will also be seen that the contact member 47b is effective to establish a circuit for connecting the positive battery wire 19 to the indicating wire 21 thus causing the indicating lamp 59 to be illuminated; and that the contact member 47c is effective in its closed position to cause energization of the magnet valve device 67 of the corresponding valve mechanism 31.

The valve mechanism 31 is accordingly operated in the manner previously described to effect a rapid release of fluid under pressure from the brake cylinders 29 of the front wheel-truck, such reduction of brake cylinder pressure continuing until the pressure switch 52f opens in response to sufficient reduction of brake cylinder pressure. When the pressure switch 52f opens, the holding circuit for the brake relay 47m is interrupted and the contact members of the relay are promptly restored to their open positions. The contact member 47b, when restored to its open position, interrupts the circuit for energizing the indicating wire 21 and thus the indicating lamp 59 is extinguished.

The contact member 47c is effective, when restored to its open position, to interrupt the energizing circuit for the magnet valve device 67 of the valve mechanism 31. The valve mechanism 31 is accordingly operated to the position in which it is effective to cause the resupply of fluid under pressure to the brake cylinder at a restricted rate.

It will accordingly be seen that the apparatus in Fig. 4 is effective to cause only sanding on all cars of the train if any pair of wheels momentarily slips, as it might do if the wheels roll on a small section of rail on which wheel adhesion is low. Such momentary bad rail condition might be due to mud on the rails as at a grade crossing. On the other hand, if the wheels continue to slip longer than a certain interval of time, indicating a continuing bad rail condition, then the brakes on that truck only which has the slipping wheels are automatically released immediately following the initiation of the automatic sanding operation.

It will also be apparent that, due to the fact that acceleration of the vehicle wheels is required in order to restore the contact members of the control relay 161 to open positions, the return of a slipping wheel or wheels to a speed corresponding to vehicle speed is insured. This is so because once the wheels begin to slip, the automatic release of the brakes cannot be forestalled unless the slipping wheels previously begin to accelerate. Thus even if the slipping wheels do decelerate to a locked condition and slide they cannot continue to slide because the reduction of brake cylinder pressure continues until a reduction sufficient to insure the acceleration of the slipping wheels back toward a speed corresponding to car speed occurs.

Summary

Summarizing, it will be seen that I have disclosed several types of brake and sanding control apparatus for a single car or train of cars employing electric means responsive to the rate of rotative deceleration of connected pairs of wheels and effective to automatically control braking and sanding operation.

In three of the types of apparatus shown, an electric circuit is provided for each individual wheel axle in which are included two current-responsive relays, one of which is picked-up when the current in the circuit exceeds a certain value corresponding to a certain rate of rotative deceleration of the wheels fixed to the axle, and the other of which is picked-up in response to a higher current corresponding to a higher rate of deceleration of the wheel and axle unit. The first of the relays that is picked-up in response to the lower rate of retardation of the wheels initiates sanding throughout the car or train. The other of the relays is effective when picked-up to initiate the release of the brakes on only a limited number of wheels, such as the wheels of a particular car truck.

Once the sanding operation is begun, it continues thereafter for a certain limited time only. The brake release operation continues until brake cylinder pressure is reduced below a certain low pressure sufficient to insure the return of the vehicle wheels to a speed corresponding to vehicle speed before permitting reapplication of the brakes.

In one type of apparatus, manually operative means is provided for causing sand to be deposited always in advance of the car wheels notwithstanding reversal of the direction of travel of the car. In the other types of apparatus shown, automatic direction selecting means is provided for causing the sanding of the road surface or rail in advance of the wheels of the car or train for opposite directions of travel.

In certain of the embodiments shown, a full-wave rectifier is employed to insure the uni-directional flow of current through the sand control and brake control relays notwithstanding a reversal of direction of travel of the car. In one of the embodiments, a reversing relay is provided which is automatically controlled by the automatic direction selective means for so controlling the circuit connections as to insure uni-directional flow of current in one direction in the relay circuit for deceleration of the vehicle wheels and uni-directional flow of current in the opposite direction for acceleration of the wheels, notwithstanding a reversal of direction of travel. In the latter embodiment, only one relay responsive to changes in the rate of rotative deceleration and acceleration of a car wheel is provided. This relay is effective to cause sanding throughout the car or train when the rate of rotative deceleration of any of the car wheels on the car exceeds a certain rate occurring only when the wheels slip. If the slipping wheel continues to decelerate rotatively for longer than a predetermined time or in any event does not begin to accelerate within a certain time, additional relays are selectively picked-up to initiate a brake release operation for a particular group of wheels or pairs of wheels including the slipping wheel. The sanding operation is automatically terminated a certain limited time after it is initiated, and the brake release operation continues until the brake cylinder pressure is reduced below a certain low pressure sufficient to insure the return of the slipping wheels to a speed corresponding to vehicle speed.

While I have disclosed and described certain specific embodiments of my invention, it will be apparent that various omissions, additions or modifications may be made in the embodiments described without departing from the spirit of my invention. For example, conventional double-end brake control may be provided instead of the single-end brake control shown. It is accordingly not my intention to limit the scope of my invention except as it is necessitated by the scope of the prior art.

Having now described my invention, what I claim as new and desire to secure by Letters Patent, is:

1. Vehicle brake and sanding control apparatus comprising, in combination, manually operative means for controlling the application and release of the brakes associated with all wheels of the vehicle, a plurality of separate means each effective upon operation to cause sanding adjacent a corresponding limited number of wheels, a plurality of brake control means each of which is effective, while the manually operated means is conditioned to cause application of the brakes, to effect the release of the brakes associated with a corresponding limited number of said wheels and subsequent reapplication thereof, and means responsive to the rotative deceleration of any of the vehicle wheels at a rate in excess of one certain rate for causing operation of all of said sanding means, and means responsive to rotative deceleration of a wheel at a rate in excess of a said second certain rate higher than said one certain rate for effecting operation of only the brake control means associated with the vehicle wheel exceeding said second certain rate of rotative deceleration.

2. Vehicle brake and sanding control apparatus comprising, in combination, manually operative means for controlling the application and release of the brakes associated with a wheel of the vehicle, means operative to effect sanding, brake control means operative, while the manually operative means is conditioned to cause application of the brakes, to effect a release of the brakes and subsequent reapplication thereof, means controlled according to the rate of rotative deceleration of the wheel for effecting operation of said sanding means and said brake control means in succession, and means for causing said sanding means to continue to effect sanding for a certain limited time, once it is operated to effect sanding, independently of the rate of rotative deceleration of the vehicle wheel.

3. Vehicle brake and sanding control apparatus comprising, in combination, manually operative means for controlling the application and release of the brakes associated with a wheel of the vehicle, means operative to effect sanding, brake control means operative, while the manually operative means is conditioned to cause application of the brakes, to effect a release of the brakes and subsequent reapplication thereof, means controlled according to the rate of rotative deceleration of the wheel for effecting operation of said sanding means and said brake control means in succession, and means effective, once the brake control means is operated to effect release of the brakes, to prevent subsequent operation thereof to effect reapplication of the brakes until the degree of application of the brakes is first reduced below a certain value independently of the rate of rotative deceleration of the wheel.

4. Vehicle brake and sanding control apparatus comprising, in combination, manually operative means for controlling application and release of the brakes associated with a vehicle wheel, means for effecting sanding, brake control means operative, while the manually operative means is conditioned to cause application of the brakes, to effect release of the brakes and subsequent reapplication thereof, means for supply a direct-current voltage substantially proportional to the speed of rotation of the vehicle wheel, a circuit on which the voltage of said voltage supply means is impressed, an electrical condenser in said circuit adapted to be charged by or to discharge a current substantially proportional to the rate of increase and decrease respectively of the voltage impressed on the circuit, a pair of current-responsive devices in said circuit, one of said current-responsive devices being operatively responsive only to a current exceeding one certain value discharged from said condenser upon the rotative deceleration of the vehicle wheel and the other of said current-responsive devices being operatively responsive only to a current exceeding a second certain value higher than said one certain value discharged from said condenser upon the rotative deceleration of the vehicle wheel, said one current-responsive device being effective upon operation to cause operation of the said sanding means and the other of said current-responsive devices being effective upon operation to cause operation of the said brake control means.

5. Vehicle brake and sanding control apparatus comprising, in combination, manually operative means for controlling the application and release of the brakes associated with a vehicle wheel, means operative to effect sanding adjacent said wheel, brake control means operative, while the manually operative means is conditioned to cause application of the brakes, to effect a release of the brakes and subsequent reapplication thereof, a pair of current-responsive devices, one of which is operatively responsive to a current exceeding a first certain value and the other of which is operatively responsive to a current exceeding a second certain value higher than the first said certain value, a circuit including said current-responsive devices in series relation therein, means for causing a current to flow in said circuit proportional to the rate of rotative deceleration of the vehicle wheel, the said one current-responsive device being effective upon operation to cause operation of the sanding means and the other of said current-responsive devices being effective upon operation to cause operation of the brake control means.

6. Vehicle brake and sanding control apparatus comprising, in combination, brake control means, means operative to effect sanding, an electric circuit, means for causing a current proportional to the rate of deceleration of a vehicle wheel to flow in said circuit, a current-responsive device effective when the current in said circuit exceeds a certain value to cause operation of the said sanding means, and a second current-responsive device effective when the current in said circuit exceeds a second certain value higher than the first said certain value to effect operation of the brake control means.

7. Sanding control apparatus for a vehicle comprising, in combination, means operative to effect the deposition of sand in advance of a vehicle wheel when the vehicle is traveling in one direction, means operative to effect the deposition of sand in advance of the vehicle wheel when the vehicle is traveling in the opposite direction, means effective when the vehicle is traveling in the said one direction to render only the first said means operative and when the vehicle is traveling in the opposite direction to render only the second said means operative, means responsive to rotative deceleration of the vehicle wheel at a rate exceeding a certain rate for causing operation of either of said two sanding means that is rendered operative and means effective to cause sanding effected by either of said sanding means to continue for a certain limited time, once sanding is begun, independently of the rate of rotative deceleration of the vehicle wheel.

8. Sanding control apparatus for a vehicle comprising, in combination, means operative to effect deposition of sand in advance of a vehicle wheel when the vehicle is traveling in one direction, other means operative to effect deposition of sand in advance of the vehicle wheel when the vehicle is traveling in the opposite direction, means automatically conditioned according to the direction of rotation of a vehicle wheel for rendering operative only that sanding means corresponding to the direction of travel of the vehicle, means responsive to the rotative deceleration of the vehicle wheel at a rate exceeding a certain rate for effecting operation of either of said sanding means depending upon the condition of the last said means, and means effective to cause sanding effected by either of said two sanding means to continue for a certain limited time after it is begun notwithstanding reduction of the rate of rotative deceleration of the vehicle wheel below said certain rate.

9. Vehicle brake and sanding control apparatus comprising, in combination, a pipe adapted to be charged with fluid at different pressures, means controlled according to the pressure in said pipe for controlling the degree of application and the release of the brakes associated with a vehicle wheel, electroresponsive means effective upon energization to cause deposition of sand in advance of the vehicle wheel, an electric relay operative from a normal position to a different position to effect energization of said electroresponsive means, means responsive to the rotative deceleration of the vehicle wheel at a rate exceeding a certain rate for causing operation of the said relay to its said different position, a holding circuit for maintaining said relay in its said different position independently of the wheel deceleration responsive means, means effective when the said relay is operated to its different position for establishing said holding circuit, and means controlled according to the pressure in said pipe for interrupting said holding circuit.

10. Apparatus for registering the direction of rotation of a rotary element comprising, in combination, a polarized relay having an operating coil and contact members actuated to one or the other of two different positions depending upon the direction of flow of current through the operating coil, a neutral relay having a pick-up coil and a holding coil, a pick-up circuit including the operating coil of the said polarized relay and the pick-up coil of the said neutral relay, means impressing a voltage on said pick-up circuit of opposite polarity depending upon the direction of rotation of the rotary element to cause current to flow in said circuit in one direction or the opposite direction in accordance with the direction of rotation of the rotary element, a holding circuit including the holding coil of the said neutral relay, said neutral relay being effective in response to the flow of current in said pick-up circuit to first establish said holding circuit and then interrupt said pick-up circuit, and means for interrupting said holding circuit whereby to cause said neutral relay to reestablish said pick-up circuit and render the polarized relay responsive to subsequent reversal of rotation of said rotary element.

11. Apparatus for registering the direction of rotation of a rotary element comprising, in combination, a polarized relay having an operating coil and contact members actuated to one or the other of two different positions depending upon the direction of flow of current in said coil, a neutral relay having a pick-up coil and a holding coil, a pick-up circuit including the operating coil of the polarized relay and the pick-up coil of the said neutral relay, means providing direct-current voltage of opposite polarity depending upon the direction of rotation of said rotary element and adapted to cause flow of current in said pick-up circuit in opposite directions depending upon the polarity thereof, a source of direct-current independent of the last said source, a holding circuit including the holding coil of said neutral relay and certain of the contact members of said polarized relay adapted to control the direction of flow of current through said holding coil in accordance with the direction of flow of current in the pick-up circuit adapted to be energized by current supplied from said independent source of current, said neutral relay being effective upon energization of the pick-up coil thereof to first establish said holding circuit and then effect the interruption of the pick-up circuit, and means for interrupting said holding circuit to cause said neutral relay to reestablish said pick-up circuit.

12. Apparatus for registering the direction of rotation of a rotary element comprising, in combination, a polarized relay having an operating coil and contact members actuated to one or the other of two different positions depending upon the direction of flow of current in said coil, a neutral relay having a pick-up coil and a holding coil, a pick-up circuit including the operating coil of the polarized relay and the pick-up coil of the said neutral relay, means providing direct-current voltage of opposite polarity depending upon the direction of rotation of said rotary element and adapted to cause flow of current in said pick-up circuit in opposite directions depending upon the polarity thereof, a source of direct-current independent of the last said source, a holding circuit including the holding coil of said neutral relay and certain of the contact members of said polarized relay adapted to control the direction of flow of current through said holding coil in accordance with the direction of flow of current in the pick-up circuit adapted to be energized by current supplied from said independent source of current, a relay having a slow-release characteristic, means for actuating the slow-release relay from one position to another position to first establish a second holding circuit for the holding coil of said neutral relay and then interrupt the first said holding circuit, and means for interrupting said second holding circuit.

13. Vehicle brake and sanding control apparatus comprising, in combination, means for controlling the application and release of the brakes associated with the vehicle wheels, means operative to effect the deposition of sand in advance of the vehicle wheels for opposite directions of rotation thereof, means adapted to be automatically variously conditioned in accordance with the direction of rotation of the vehicle wheel for rendering the sanding means selectively effective to deposit sand only in advance of the vehicle wheels, means effective to prevent variation of the condition of said direction responsive means once it is conditioned in a certain manner, and means effective in response to the release of the brakes for rendering the variation preventing means ineffective whereby to enable the direction responsive means to be thereafter responsive to a reversal of direction of rotation of the vehicle wheel.

14. Vehicle brake and sanding control apparatus comprising, in combination, manually operative means for controlling the application and the release of the wheel brakes on the vehicle, means operative to effect sanding, brake control means operative, while the manually operative means is conditioned to cause application of the brakes, to effect the release of the brakes and the subsequent reapplication thereof, means responsive to the rate of rotative deceleration of a vehicle wheel, and means controlled by the last said means for instantly effecting operation of said saiding means whenever the rate of deceleration of the vehicle wheel exceeds a certain rate and effective to cause operation of the brake control means only if the rotative deceleration of the vehicle wheel endures for a certain predetermined time following the instant the said wheel first decelerates at a rate exceeding said certain rate.

15. Vehicle brake and sanding control apparatus comprising, in combination, manually operative means for controlling the application and release of the vehicle wheel brakes, means operative to effect sanding, brake control means operative, while the manually operative means is conditioned to cause application of the brakes, to effect the release of the brakes and subsequent reapplication thereof, an electric circuit, means for causing a current to flow in said circuit proportional to the rate of rotative deceleration of a vehicle wheel, current-responsive means operative only in response to a current in said circuit exceeding a certain value and corresponding to a certain rate of rotative deceleration of the vehicle wheel, a relay controlled by the current-responsive means and effective when the current-responsive means is operated to instantaneously cause operation of said sanding means, another relay having a slow pick-up characteristic and under joint control of said current-responsive means and the first said relay effective only upon the elapse of a predetermined time following the operation of the first said relay for causing operation of the brake control means.

16. In a brake and sanding control system for a wheeled vehicle, in combination, means for effecting an application of the vehicle brakes to brake the wheels of the vehicle, means governed by the rate of deceleration of a vehicle wheel and operative to produce different degrees of electrical effect for different rates of deceleration of the wheel, a sanding control device responsive to one degree of said electrical effect for initiating sanding of the track rails, and a brake control device responsive to another degree of said electrical effect for initiating a release operation of the brakes on said wheel.

17. In a brake and sanding control system for a wheeled vehicle, in combination, means for effecting an application of the vehicle brakes to brake the wheels of the vehicle, means governed by the rate of deceleration of a vehicle wheel and operative to produce different degrees of electrical effect for different rates of deceleration of the wheel, a sanding control device responsive to one degree of said electrical effect for initiating sanding of the track rails, and a brake control device responsive to a higher degree of said electrical effect for initiating a release operation of the brakes on said wheel.

18. Apparatus for registering the direction of rotation of a rotary element comprising, in combination, an electrical circuit, means for causing a current to flow in said circuit proportional to the speed of rotation of the rotary element, a polarized relay having an operating coil in said circuit and a contact member actuated to one or the other of two different positions depending upon the direction of flow of current through the operating coil, and a neutral relay having an operating coil in said circuit and a contact member effective upon energization of the operating coil of the relay by a current exceeding a certain value to cause interruption of the flow of current through the operating coil of the polarized relay, the operating coil of the polarized relay being effective to cause actuation of the contact member of the polarized relay to one or the other of the two positions thereof corresponding to the direction of flow of current through the operating winding in response to energization by a current less than the current required to cause actuation of the contact member of the neutral relay to interrupt the flow of current through the operating coil of the polarized relay.

19. Apparatus for registering the direction of rotation of a rotary element comprising, in combination, an electrical circuit, means for impressing on said circuit a voltage substantially proportional to the speed of rotation of the rotary element and of opposite polarity for opposite directions of rotation of the rotary element, a polarized relay having an operating winding in said circuit and a contact member actuated to one or the other of two different positions depending upon the polarity of the voltage impressed on said circuit whenever the voltage impressed on the circuit exceeds a certain value, and a neutral relay having an operating winding in said circuit and a contact member which is actuated to a position for deenergizing the operating coil of the polarized relay whenever the voltage impressed on the circuit exceeds a second certain value higher than the first said certain value.

20. Vehicle brake and sanding control apparatus comprising, in combination, manually operated means for controlling the application and release of the wheel brakes on the vehicle, means operative to effect sanding, brake control means operative, while the manually operative means is conditioned to cause application of the brakes, to effect the release of the brakes and the subsequent reapplication thereof, means responsive to the rate of rotative deceleration and acceleration of a vehicle wheel, and means controlled by the last said means for instantly effecting operation of said sanding means whenever the rate of deceleration of the vehicle wheel exceeds a certain rate and effective to cause operation of the brake control means only in the event that the said vehicle wheel does not begin to accelerate within a certain predetermined time after the wheel first exceeds said certain rate of rotative deceleration.

CLAUDE M. HINES.